(12) United States Patent
Kerfeld

(10) Patent No.: US 6,365,329 B2
(45) Date of Patent: *Apr. 2, 2002

(54) PROCESS FOR MAKING MULTIPLE DATA STORAGE DISK STAMPERS FROM ONE MASTER

(75) Inventor: Donald J. Kerfeld, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/746,980

(22) Filed: Dec. 21, 2000

Related U.S. Application Data

(63) Continuation of application No. 09/055,641, filed on Apr. 6, 1998, now Pat. No. 6,190,838.

(51) Int. Cl.$^7$ .................................................. G11B 7/26
(52) U.S. Cl. ...................... 430/321; 430/320; 264/1.33; 264/1.38; 264/2.3; 264/1.37
(58) Field of Search ................................. 420/321, 320; 264/1.33, 1.38, 2.3, 1.37

(56) References Cited

U.S. PATENT DOCUMENTS

| | | | |
|---|---|---|---|
| 3,565,978 A | * 2/1971 | Folger et al. | 264/1.34 |
| 4,374,077 A | 2/1983 | Kerfeld | 264/28 |
| 4,726,006 A | * 2/1988 | Benne et al. | 264/220 |
| 4,729,938 A | 3/1988 | Tajima et al. | 430/272.1 |
| 5,149,607 A | * 9/1992 | DeGraaf et al. | 430/321 |
| 5,458,985 A | 10/1995 | Isono et al. | 428/601 |
| 5,586,109 A | * 12/1996 | Inui et al. | 369/277 |
| 5,597,613 A | 1/1997 | Galarneau et al. | 427/162 |
| 6,190,838 B1 | * 2/2001 | Kefeld | 430/320 |

FOREIGN PATENT DOCUMENTS

| | | |
|---|---|---|
| EP | 0 358 276 | 3/1990 |
| FR | 2 676 577 | 11/1992 |
| JP | 57-172553 | * 10/1982 |
| JP | 59-114031 | 6/1984 |
| JP | 62-095749 | * 5/1987 |

(List continued on next page.)

OTHER PUBLICATIONS

Dill, F. et al., "Characterization of Positive Photoresist," *IEEE Transactions on Electron Devices*, ED–22, No. 7, pp. 445–452 (Jul. 1975).

Trefonas, P., et al., "New Principle for Image Enhancement in Single Layer Positive Photoresists," Proc. for SPIE, 771, pp. 194–210 (Mar. 1987).

Horigome et al., "Novel stamper process for optical disc," Optical Storage Technology and Applications, Proceedings of SPIE–The International Society for Optical Engineering, Los Angeles, CA, Jan. 12–15, 1998, vol. 899, XP 000010872, pp. 123–128.

Nakamura, Shigeru et al., "High Density Recording for Magneto–optical Disk Drive," *IEEE Transactions on Magnetics*, 34, No. 2, pp. 411–413 (Mar. 1998).

Primary Examiner—Martin Angebranndt
(74) Attorney, Agent, or Firm—Eric D. Levinson

(57) ABSTRACT

A method of making a stamper for use in a data storage disk molding process. The method includes making a first stamper including the steps of providing a stamper body having an information layer thereon. The information layer is covered with a first metal layer. A second stamper is made from the first stamper, which includes the steps of covering the first metal layer with a second metal layer to form a stamper assembly, wherein the first metal layer and the second metal layer are bonded together. The first metal layer and the second metal layer are removed from the stamper assembly to form the second stamper, wherein removal of the first metal layer and the second metal layer is nondestructive to the information layer. In one application, the first metal layer and the second metal layer are made of nickel.

25 Claims, 11 Drawing Sheets

| | U.S. PATENT DOCUMENTS | | | JP | 9-138981 | | 5/1997 |
|---|---|---|---|---|---|---|---|
| | | | | JP | 03-037842 | * | 2/1999 |
| JP | 01-301880 | * | 12/1989 | WO | WO 97/12279 | | 4/1997 |
| JP | 3-37842 | | 2/1991 | | | | |
| JP | 9-097452 | | 4/1997 | * cited by examiner | | | |

PROCESS FOR MAKING MULTIPLE DATA STORAGE DISK STAMPERS FROM ONE MASTER

This application is a continuation of application Ser. No. 09/055,641, filed Apr. 6, 1998, now U.S. Pat. No. 6,190,838.

TECHNICAL FIELD

The present invention relates generally to the field of manufacture of data storage disks, and in particular, to a method of making multiple optical data storage disk stampers from one master, while maintaining the integrity of data tracks encoded therein.

BACKGROUND OF THE INVENTION

Optical data storage disks have gained widespread acceptance for the storage, distribution and retrieval of large volumes of information. These disks include audio and video program material, as well as computer programs and data. Formats of optical data disks include audio CD (compact disc), CD-R (CD-recordable), CD-ROM is (CD-read only memory), DVD (digital versatile disk or digital video disk) media, DVD-RAM (random access memory), and various types of rewritable media, such as magneto-optical (MO) disks and phase change optical disks.

In general, optical disks (such as CD-ROMs) are produced by making (e.g., laser recording) a master which has physical features representing the data formed in or on a reference surface therein. The master is used to make a stamper, which, in turn, is used in an injection molding process to make production quantities of replica disks, each containing the data and tracking information which was encoded in the master.

For example, during the injection molding process for CD-ROMs, the stamper data is molded into each disk substrate by the formation of lower reflectance "pits" embossed within a plane of higher reflectance "lands". Typically, the information side of the disk is then coated with a reflectance layer, such as a thin layer of aluminum, and in the case of a CD, followed by a protective layer of lacquer. The data tracks on an optical disk can be arranged in a spiral track originating at the disk center and ending at the disk outer edge, or alternatively, a spiral track originating at the disk outer edge and ending at the disk center. The data can also lie in a series of concentric tracks spaced radially from the disk center.

Several thousand (e.g., 50,000) replica disk substrates may be made using the same stamper. As a result of the pressure and temperature cycling involved in the molding process, stampers become damaged and wear. For most optical data storage disk products, a first generation stamper is made by electroforming or electroplating a recorded master disk. This process is destructive to the recorded master disk, resulting in one stamper per recorded master. Since the cost of making a recorded master disk can be significant, the process yields and lifetime of the stamper account for a significant percentage of the final optical data storage disk cost.

In an attempt to lower manufacturing costs and increase efficiency, processes have been developed to make multiple stampers from one master disk. Conventional processes for making stampers from a master disk include a pyramiding family process. This process involves the making of a "father" stamper or first generation stamper from the master. The father stamper is used to make a "mother" stamper or second generation stamper. The same process may be repeated using the "mother" stamper to make a "daughter" or third generation stamper.

The process of electroforming multiple generations of stampers has known disadvantages. Conventional processes are destructive to the master disk. At each generation, (father, mother, daughter), a surface treatment is necessary to achieve separation, resulting in a molded replica disk with encoded information having a noise floor increase and a signal quality decrease. Known conventional processes do not work well with optical disks formats where the ratio of pit volume to surface area is small. After completion of the forming process, the encoded data tracks may be damaged when separating the father stamper from a mother stamper (or the mother stamper from a daughter stamper).

SUMMARY OF THE INVENTION

In one embodiment, the present invention provides a method of making a stamper for use in a data storage disk molding process. The method includes making a first stamper comprising the steps of providing a stamper body having an information layer thereon, and covering the information layer with a first metal layer. A second stamper is made from the first stamper by covering the first metal layer with a second metal layer to form a stamper assembly. The first metal layer and the second metal layer are bonded together. The first metal layer and the second metal layer are removed from the stamper assembly to form the second stamper. Removal of the first layer and the second layer from the stamper assembly is non-destructive to the information layer.

The first metal layer and the second metal layer are made of the same metal. In one preferred embodiment, the first metal layer and the second metal layer are made of nickel. The step of covering the information layer with the first metal layer includes depositing a relatively thin layer of nickel onto the information layer. The information layer is made of a photopolymer. The step of covering the first metal layer with the second metal layer includes electroplating the second metal layer onto the first metal layer.

In one application, the first stamper is a first generation stamper and the second stamper is a second generation stamper. In another application, the first stamper is a second generation stamper, and the second stamper is a third generation stamper.

In another embodiment, the present invention provides a method which allows the making of multiple optical disk stampers from one recorded master using a second generation process. The method includes providing a recorded master. A first generation stamper is made from the recorded master using a photopolymerization process. A second generation stamper is made from the first generation stamper using an electroplating process, wherein a portion of the first generation stamper becomes part of the second generation stamper.

In a third embodiment, the present invention provides a method which allows the making of multiple optical disk stampers from a recorded master. The method includes recording a master disk. A first generation stamper is made from the master disk using a photopolymerization process. The photopolymerization process includes forming a first stamper body having a photopolymer information layer thereon. The information layer is coated with a first metal layer. A second generation stamper is made from the first generation stamper, including coating the first metal layer with a second metal layer to form a stamper assembly. The first and second metal layers are separated from the stamper assembly to form the second generation stamper, wherein separating the first and second generation stamper from the stamper assembly is non-destructive to the information layer. In one preferred embodiment, the first metal layer and the second metal layer are made of the same metal, and more preferably, the first metal layer and the second metal layer are made of nickel. The step of covering the first metal layer with the second metal layer includes the step of electroplating the second metal layer onto the first metal layer.

The step of recording the master disk may further include providing a glass substrate having a photoresist layer attached to the glass substrate through a bonding layer. An information layer is recorded on the master disk through exposing the photoresist layer to a laser beam, including exposing a portion of the photoresist layer down to the bonding layer to form a master pit.

The step of making a first generation stamper from the master disk may further include sputtering a nickel layer onto an information layer on the master disk. A photopolymer layer is positioned between the nickel layer and the first structural layer using a rolling bead process. The photopolymer layer is cured with an ultra-violet light source. Both the photopolymer and first structural layers are separated from the nickel layer, wherein separation of from the nickel layer is non-destructive to the master disk. A second structural layer is bonded to the first structural layer, and the bonding photopolymer is cured with a UV light source. In one preferred application, the first structural layer is made of polymethylmethacrylate, and the second structural layer is made of glass. A rolling bead process is used to bond the second structural layer to the first structural layer.

In a fourth embodiment, the present invention provides a method of making multiple optical disk stampers from one recorded master using a third generation process. The method includes recording a master disk. A first generation stamper is made from the master disk using an electroplating process. A second generation stamper is made from the first generation stamper using a photopolymerization process. A third generation stamper is made from the second generation stamper using an electroplating process.

The first generation stamper includes an information surface, and making the second generation stamper from the first generation stamper further includes a photopolymer layer between the first generation stamper and a first structural layer using a rolling bead process. The photopolymer layer is cured with an ultra-violet light source. The nickel first generation stamper is separated from the photopolymer layer. A thin nickel coating is put on the information surface. In one application, the first structural layer is made of glass.

The step of making a third generation stamper from the second generation stamper may include coating the photopolymer layer with a first metal layer. The first metal layer is coated with a second metal layer to form a stamper assembly. The first metal layer is separated from the photopolymer layer to form the third generation stamper, wherein separating the first and second metal layers from the stamper assembly is non-destructive to the second generation stamper. In one preferred application, the first metal layer and the second metal layer are formed of the same metal, which is nickel. The step of coveting the first metal layer with the second metal layer includes the step of electroplating the second metal layer onto the first metal layer.

BRIEF DESCRIPTION OF THE DRAWINGS

Other options of the present invention and many of the attendant advantages of the present invention will be readily appreciated as the same becomes better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

The present invention provides a process for making multiple stampers from one master. The process techniques described herein can be used for making a first, second, or third generation stamper. The process includes a step which is a photopolymerization step which is non-destructive to either the recorded master, first generation stamper or second generation stamper. This allows many next generation stampers to be made, while maintaining the integrity of the information layer transferred from the previous generation disk. In one preferred embodiment, a portion of a first stamper, which defines the information layer is transferred to and becomes part of a second stamper without changing the integrity of the information layer.

Figure 1:
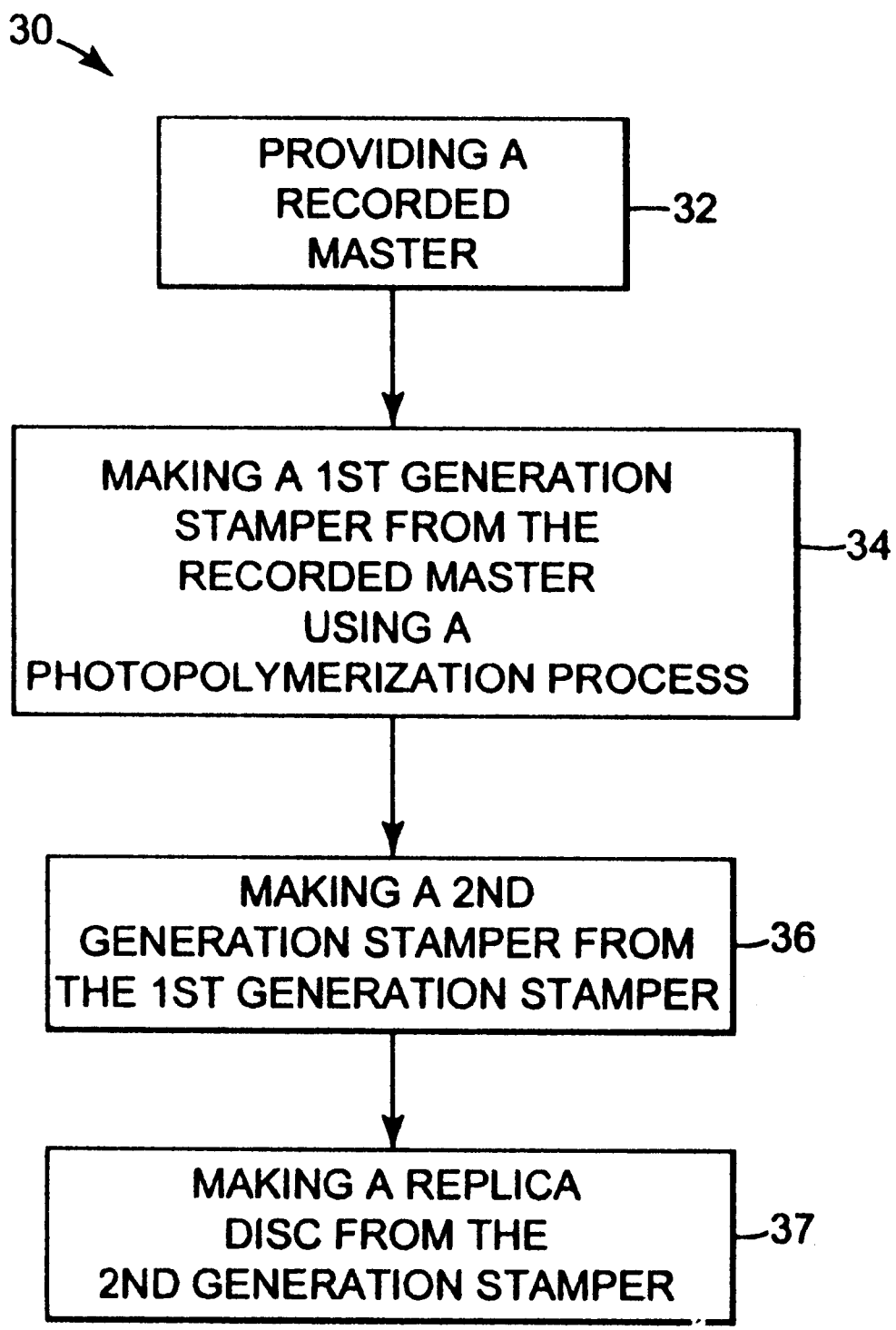
FIG. 1 is a block diagram illustrating one exemplary embodiment of a process for making multiple optical disk stampers from one master in accordance with the present invention.

In FIG. 1, a block diagram illustrating a process for making multiple stampers from one master in accordance with the present invention 30 is shown. In the exemplary embodiment shown, the process for making a stamper 30 provides for making a second generation stamper for use in a process for molding optical data storage disk substrates. The process 30 begins with providing a recorded master disk 32. A first generation stamper is made from the recorded master using a photopolymerization process, indicated at 34, which is nondestructive to the recorded master allowing for many first generation stampers to be made from a single recorded master. A second generation stamper is made from the first generation stamper, indicated at 36.

In one exemplary embodiment, the recorded master includes an information layer having data which is encoded thereon using laser writing (i.e., recording) techniques. The first generation stamper is made from the recorded master using a photopolymerization process. The photopolymerization process is non-destructive to the recorded master, and maintains the integrity of the information layer transferred from the recorded master to the first generation stamper. The second generation stamper is made from the first generation stamper. In one preferred embodiment, a portion of the first generation stamper, which defines the information layer, is transferred to and becomes part of the second generation stamper. The second generation stamper is made from the first generation stamper using an electroforming (i.e., electroplating) process.

Figure 2:
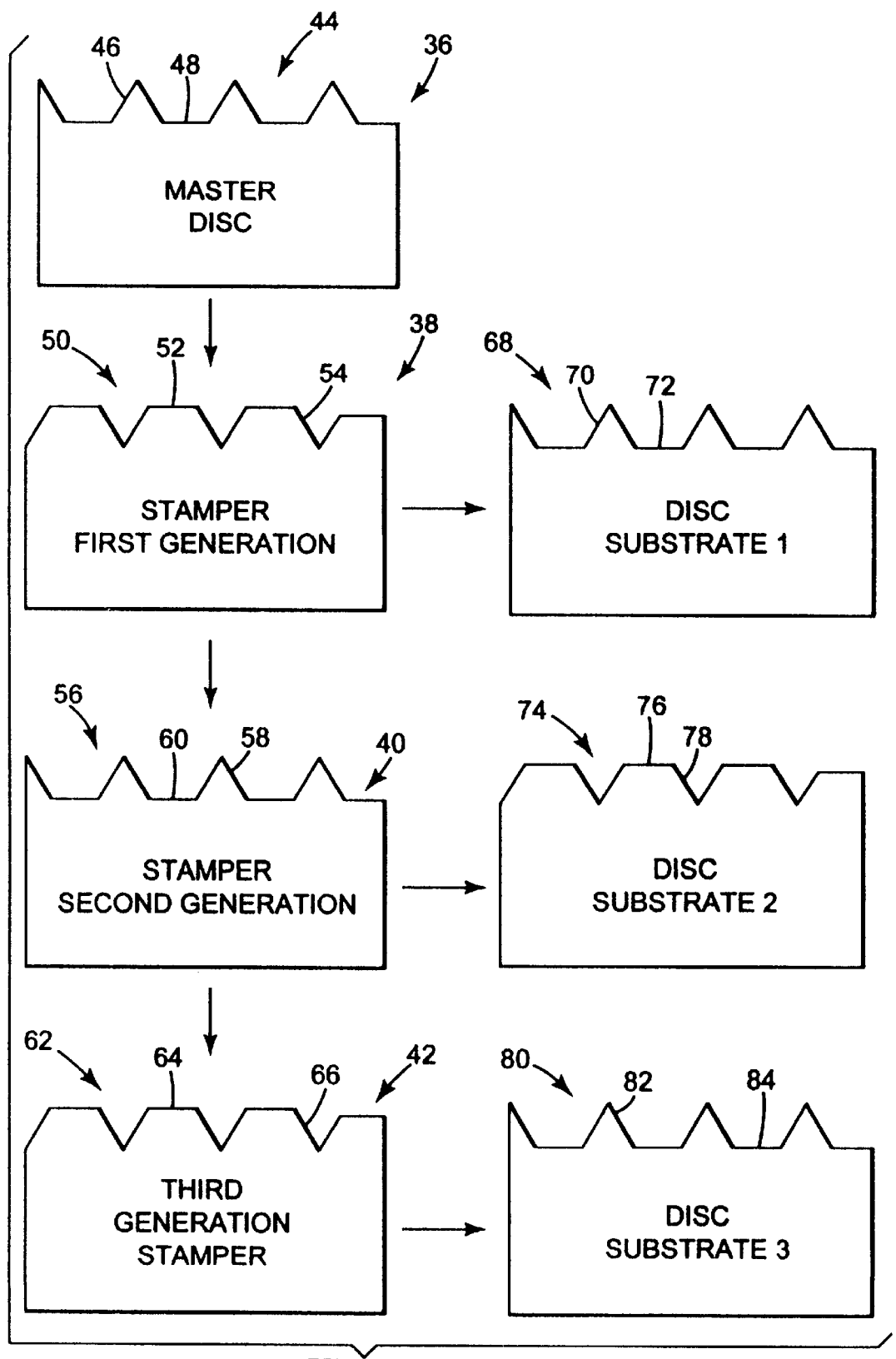
FIG. 2 is a diagram illustrating information layer orientation for an optical disk molded from a first generation, second generation or third generation stamper in accordance with the present invention.

In FIG. 2, a diagram illustrating "groove" orientation of an optical disk substrate (i.e., a replica disk) molded from a first generation stamper, a second generation stamper or a third generation stamper, is shown. The diagram includes enlarged, partial cross sections illustrating the orientation of the information layer of a master disk 36, first generation stamper 38, second generation stamper 40, third generation stamper 42, disk substrate 1, disk substrate 2, and disk substrate 3. Information is encoded onto the master disk 36 in the form of data tracks (i.e., a series of grooves and lands) having an orientation based on whether a replica disk substrate is molded from a first, second or third generation stamper.

In particular, master disk 36 includes master information layer 44 having master lands 46 and master grooves 48. First generation stamper 38 includes first generation stamper information layer 50 having first generation stamper lands 52 and first generation stamper grooves 54. Second generation stamper 40 includes second generation stamper information layer 56 having second generation stamper lands 58 and second generation stamper grooves 60. Third generation stamper 42 includes third generation stamper information layer 62 having third generation stamper lands 64 and third generation stamper grooves 66. Similarly, disk substrate 1 includes substrate 1 information layer 68 having substrate 1 lands 70 and substrate 1 grooves 72; disk substrate 2 includes substrate 2 information layer 74 having substrate 2 lands 76 and substrate grooves 78; and disk substrate 3 includes substrate 3 information layer 80 having substrate 3 lands 82 and substrate grooves 84.

The orientation of disk substrate 1 information layer 68 molded from first generation stamper 38 corresponds to the orientation of the master disk information layer 44. In particular, the first generation stamper 38 information layer 50 is the inverse of the master disk information layer 44. Similarly, disk substrate 1 information layer 68 is the inverse of first generation stamper information layer 50.

Second generation stamper 40 information layer 56 is the inverse of the first generation stamper 38 information layer 50, resulting in disk substrate 2 information layer 74 being the inverse of second generation stamper 40 information layer 56 and master disk information layer 44. Likewise, third generation stamper 42 information layer 62 is the inverse of the second generation stamper 40 information layer 56. Accordingly, disk substrate 3 information layer 80 is the inverse of the third generation stamper 42 information layer 62, and corresponds or has the same orientation as the master disk information layer 44.

It is recognized that the orientation of the master disk information layer 44 is dependent on the desired orientation of the replica disk substrate for its intended use. For example, for air incident applications, it may be desirable to mold a replica disk substrate having flat lands, and for disks read through the substrate, it may be desirable to mold a replica disk having flat grooves.

Referring to FIGS. 3–10, one exemplary embodiment of the process for making a stamper in accordance with the present invention (illustrated in FIG. 1) is described in greater detail.

Figure 3:
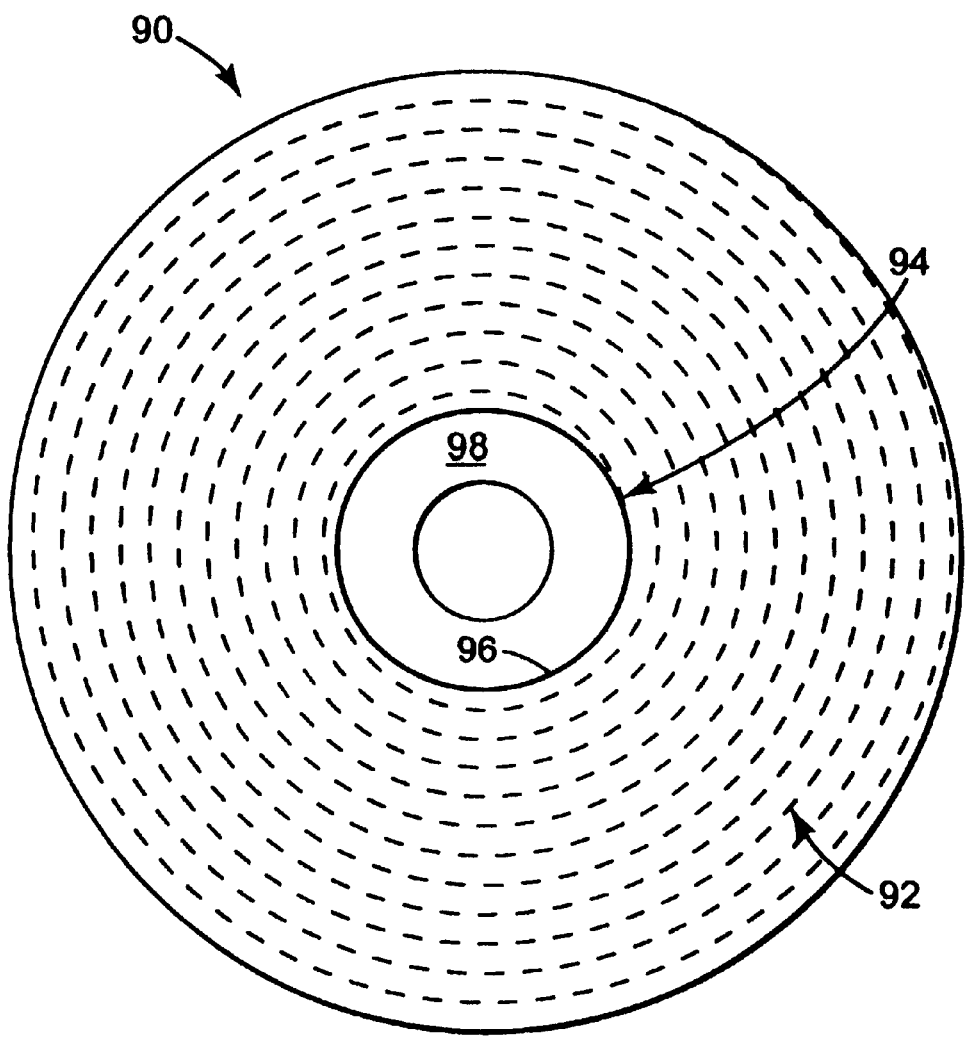
FIG. 3 is a plan view of one exemplary embodiment of a recorded master optical disk for use with a process for making a stamper in accordance with the present invention.

In FIG. 3, a plan view illustrating one exemplary embodiment of a recorded master disk 90 in accordance with the present invention is generally shown. The recorded master disk 90 can be similar to a recorded master disk used in disk molding replication processes for read-only or writable optical disks, such as CD-ROM, DVD, MO or phase change optical disks, as previously indicated herein. The recorded master disk 90 includes an information area 92 and a central portion 94 having an opening 96 therethrough. Optionally, a hub 98 can be located at opening 96, or the recorded master disk may not include an opening at all. Information area 92 includes data tracks (in the form of a series of grooves (or pits (e.g., in the header area) and lands) encoded therein.

One preferred disk mastering process for making a master disk for use with the present invention is disclosed in U.S. patent application Ser. No. 09/055,825, filed on Apr. 6, 1998. The disk mastering process includes exposing a layer of photoresist down to the disk substrate, resulting in the formation of flat, wide, relatively deep master disk grooves (and/or pits).

Figure 4:
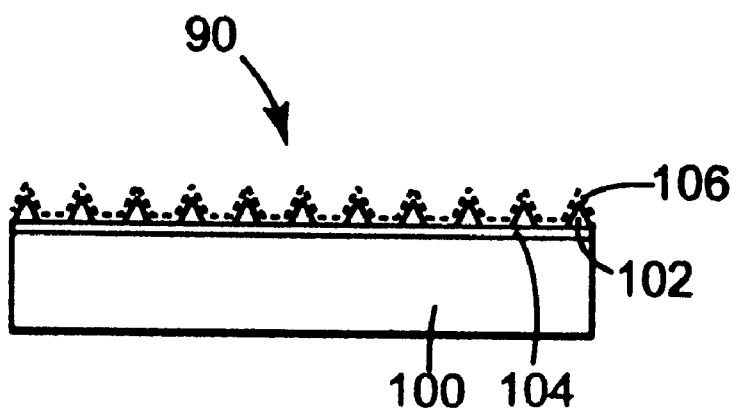
FIG. 4 is a partial cross section illustrating a recorded master optical disk for use in a process for making a stamper in accordance with the present invention.

Referring to FIG. 4, a partial cross-sectional view illustrating one exemplary embodiment of recorded master disk 90 is shown. Recorded master disk 90 includes a support substrate 100 coupled to information layer 102 by a bonding layer 104. Recorded master disk 90 may further include a reflective layer 106 positioned over information layer 102. In one preferred embodiment, support substrate 100 is made of glass and is approximately 5 mm thick. The glass substrate is polished smooth on one side with optical polish. The glass substrate is then washed in a clean room to remove contaminants. A very thin bonding layer 104 (approximately 10 nanometers) of primer is spin coated onto the glass support substrate 100.

Information layer 102 may be formed by spin coating a layer of photoresist onto the bonding layer 104. The thickness of the information layer 102 (e.g., 50–200 nanometers) varies as desired according to the spin speed and the photoresist solution. Since spin coating is a solvent based process, the solvent can be driven out of the master 90 using a pre-bake process. The master 90 is then placed on a laser beam recorder (i.e., laser beam exposure table), wherein the laser beam is turned on and the master is spun at a desired speed to expose the information layer 102 (i.e., the photoresist) to the laser beam. The on and off cycling of the laser beam is representative of the data to be encoded within the data tracks of information layer 102, or for the formation of grooves in the disk substrate.

Exposed master disk 90 undergoes a development process. In one preferred embodiment, sodium hydroxide and water are dispersed across the master disk 90 as it rotates. As the master disk 90 is spinning, the photoresist is etched away by the solution in the areas where the photoresist was exposed to the laser beam. The desired data pattern is now encoded on the master disk 90.

With the process for making a stamper in accordance with the present invention, it is desirable to make many stampers from a single recorded master disk. As such, it is desirable to make a highly durable recorded master disk. To increase the durability of the recorded disk 90, after exposure of the disk 90 to the laser beam recorder and it is developed, disk 90 is passed through a baking process. Prior to baking, disk 90 photoresist may be UV exposed. Baking disk 90 strengthens the cross-inking of the photoresist in the information layer 102, improving and increasing the bond strength of the photoresist to bonding layer 104. The desired temperature and bake time depends on the type of photoresist used in the process (e.g., baking the disk at a temperature of 100E C. for 1 hour). It is recognized that over baking of the disk may tend to undesirably round the edges of the pit, or even worse, may eliminate them. The process of baking the recorded master disk may be modified to improve groove and pit geometries for a desired disk product.

In one exemplary embodiment, for an air incident disk substrate, it is desirable to vary the intensity of the laser beam for a sufficient exposure time such that a master groove or pit (i.e., an interrupted master groove) is defined by the photoresist being etched away down to the adhesive layer 104, resulting in high definition pits. Although the mastering process described herein utilizes a positive photoresist process, it is also recognized that a negative photoresist process may be used, as known by those skilled in the art.

Recorded master disk 90 is coated with reflective layer 106. In one preferred embodiment, the information layer 102 of recorded master disk 90 is coated with a relatively thin layer (e.g., 10 nanometers) of a metal, preferably nickel (it is recognized other metal may be used, such as chromium). The relatively thin reflective layer 106 serves at least two purposes. It provides a high quality reflecting surface for optical inspection of the disk quality and defects. Further, it acts as a barrier such that multiple copies (or first generation stampers) of the master disk 90 information layer 102 may be made from master disk 90 using a photopolymerization process without it being destructive to the recorded master disk 90.

Figure 5:
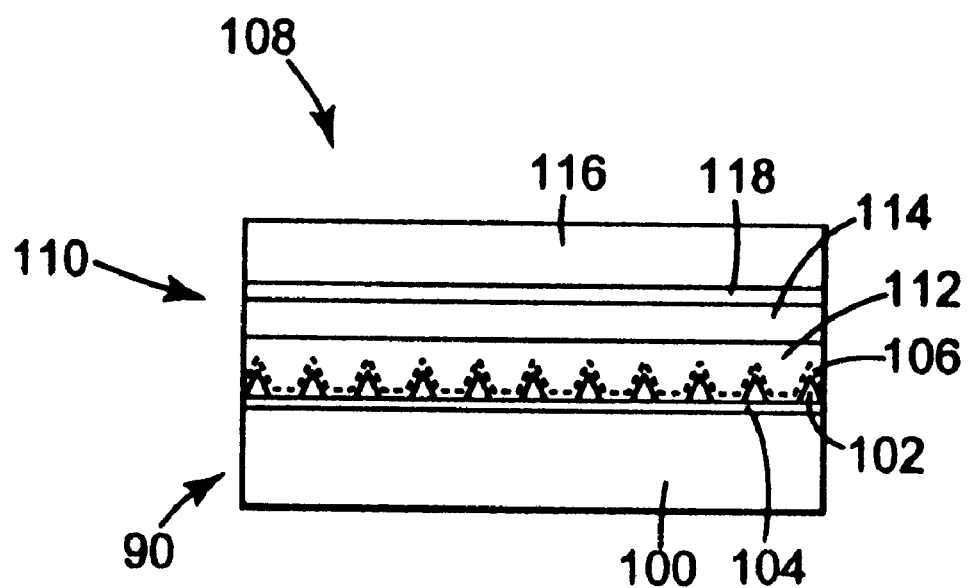
FIG. 5 is a diagram illustrating one exemplary embodiment of a photopolymerization first generation construction for making a first generation stamper from a recorded master optical disk in accordance with the present invention.

In FIG. 5, one exemplary embodiment of a stamper assembly 108 is shown illustrating all the steps of the making of a first generation stamper from recorded master disk 90 using a photopolymerization process in accordance with the present invention. In particular, stamper assembly 108 includes recorded master disk 90 and first generation stamper 110. First generation stamper 110 includes information layer 112 and first support layer 114. Information layer 112 is positioned between reflective layer 106 and support layer 114. In one preferred embodiment, first support layer 114 is made of polymethylmethacrylate (PMMA) and information layer 112 is preferably made of a photopolymer. Preferably, a photopolymer information layer 112 is positioned between the first support layer 114 and reflective layer 106 using a rolling bead process.

Figure 6:
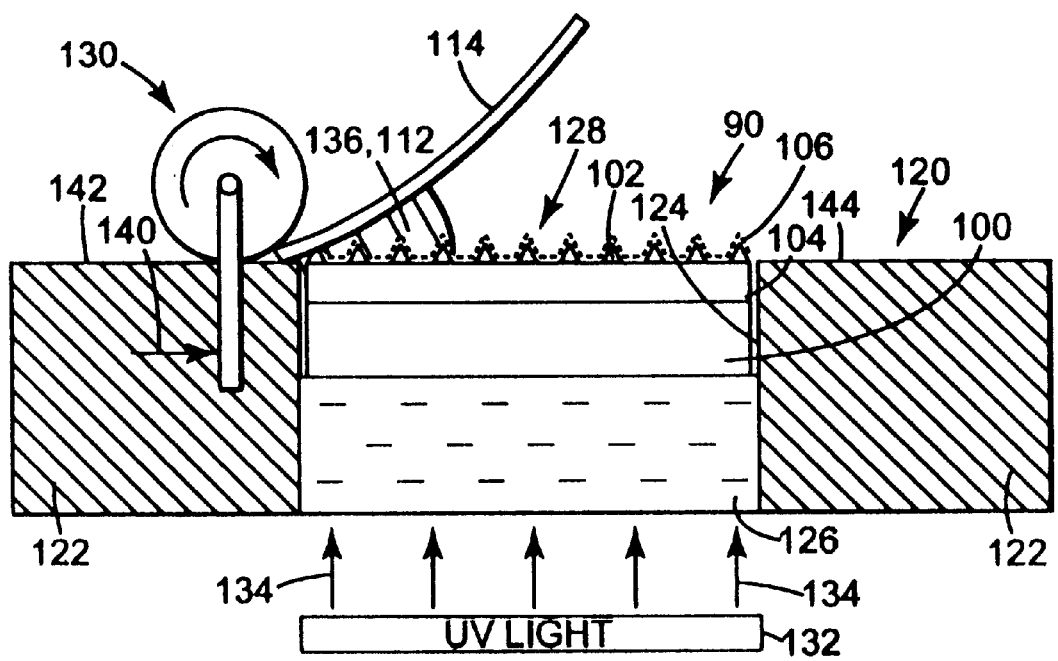
FIG. 6 is a diagram illustrating one exemplary embodiment of a bead rolling process used in a process for making a stamper in accordance with the present invention.

In FIG. 6, a diagram illustrating one exemplary embodiment of positioning information layer 112 between reflective layer 106 and first support layer 114 using a rolling bead process in accordance with the present invention is shown. One preferred rolling bead process for use in a process for making a stamper in accordance with the present invention is disclosed in U.S. Pat. No. 4,374,077 issued on Feb. 15, 1983, entitled "Process for Making Information Carrying Disks", the entire disclosure of which is incorporated herein by reference.

Master disk 90 is placed in a rolling bead process mechanism 120. Rolling bead process mechanism 120 includes side wall 122 having a hole or opening 124 passing therethrough. Base 126 is positioned within opening 124. In one preferred embodiment, base 126 is made of a polymeric material (e.g., polycarbonate) or glass and is transparent to UV light. Side wall 122, opening 124, and base 126 define a recess 128, which is slightly larger in diameter than master disk 90. As such, recess 128 is capable of receipt of master disk 90, such that master disk 90 is supported on base 126. Rolling bead processing mechanism 120 further includes roller mechanism 130 which is moveable relative to side wall 122 and base 126, and which moves across recess 128. UV light source 132, which selectively emits UV light 134, can be positioned adjacent transparent base 126.

In operation, master disk 90 is positioned within recess 128. A quantity of photopolymer 136 (which forms information layer 112) is dispensed (in liquid form) at an outside edge of master disk 90. First support layer 114 is positioned over photopolymer layer 136. Roller mechanism 130 is operated in a first direction, indicated by directional arrow 140, and rolled over first support layer 114. As roller mechanism 130 passes between first side 142 and second side 144, the information layer photopolymer 136 is distributed in uniform thickness across the master disk 90 reflective layer 106, and distributes the liquid photopolymer 136 between the first support layer 114 and reflective layer 106 to form information layer 112.

After completion of operation of roller mechanism 130 and positioning of first support layer 114 over photopolymer information layer 112, UV light source 132 is operated to cure the photopolymer information layer 112. In particular, since base 126 is transparent, UV light 134 passes through base 126, support substrate 100, bonding layer 104, information layer 102, and reflective layer 106 to cure the photopolymer information layer 112. Once cured, the photopolymer information layer 112 is securely bonded to first support layer 114.

The photopolymer information layer 112 and first support layer 114 are stripped back or removed from master disk 90. As first support layer 114 is pulled, the photopolymer information layer 112 releases from the reflective layer 106. Information layer 112 is an information layer having data tracks encoded therein having an orientation which is the inverse of information layer 102. The removal of photopolymer information layer 112 and support layer 114 from master disk 90 is a nondestructive process to the master disk 90. Reflective layer 106 remains on the information layer 102 of the recorded master disk 90. Master disk 90 is now reusable for making many first generation stampers from the recorded master disk 90 using the same process discussed above.

Figure 7:
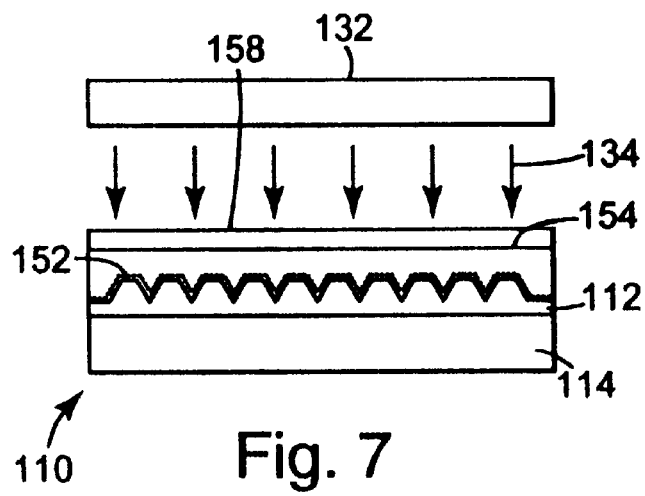
FIG. 7 is a diagram illustrating one exemplary embodiment of preparing a first generation stamper in a process for making a stamper in accordance with the present invention.

In FIG. 7, first generation stamper 110 is shown, having a metal layer 152 and protective layer 154 coated thereon. In one preferred embodiment, metal layer 152 is nickel and protective layer 154 is a photopolymer. It is desirable to prepare first generation stamper 110 for an electroplating process to make a second generation stamper from the first generation stamper 110. Photopolymer information layer 112 is very fragile, and may include a high volume of data encoded therein. If information layer 112 came into contact with anything, data tracks would be destroyed. For example, contact with a human hair could destroy 225 data tracks. A single scratch across the information layer may make a subsequently molded disk unusable.

In one application, metal layer 152 is preferably nickel, and a 30 nanometer nickel layer is sputtered onto the photopolymer information layer 112. The first generation stamper assembly 110 is again placed within rolling bead process mechanism 120. A quantity of liquid photopolymer 154 is placed between metal layer 152 and sheet 158. Sheet 158 is preferably transparent such that UV light may pass therethrough. The rolling bead process mechanism 120 is operated to distribute a uniform thickness layer of photopolymer 154 between sheet 158 and metal layer 152 to form protective layer 154.

UV light source 132 having UV light 134 is positioned adjacent sheet 158 and activated for curing the photopolymer protective layer 154 on the first generation stamper assembly 110. After the photopolymer layer 154 is cured, sheet 158 is removed (e.g., peeled off from the first generation stamper assembly 110).

Figure 8:
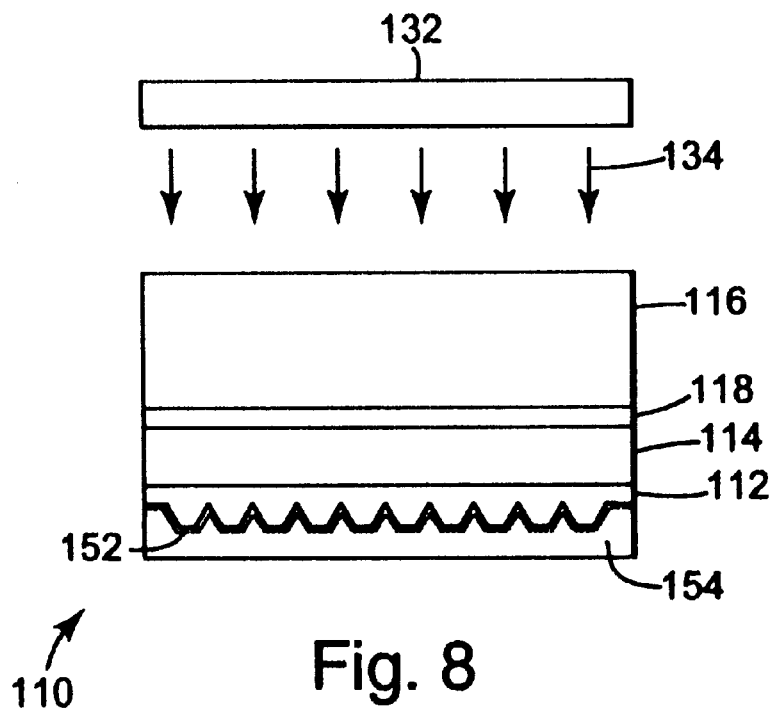
FIG. 8 is a diagram illustrating one exemplary embodiment of preparing a first generation stamper in a process for making a stamper in accordance with the present invention.

Referring to FIG. 8, second support layer 116 is added to first generation stamper assembly 110 to provide additional support to assembly 110 and maintain flatness for the electroplating process. In one preferred embodiment, second support layer 116 has a 5 mm thickness and is made of glass. An adhesion primer is spun coated on the glass support substrate 116. Using rolling bead processing mechanism 120, a photopolymer bonding layer 118 (e.g., a 10 micron photopolymer bonding layer) is uniformly distributed between second support layer 116 and first support layer 114. The photopolymer bonding layer 118 provides adhesion between first support layer 114 and second support layer 116. Bonding layer 118 is cured using UV light source 132 through the support layer 116.

Protective layer 154 is removed from first generation stamper assembly 110 to allow a second generation stamper to be formed from the first generation stamper assembly 110. Protective layer 154 is "stripped" or "peeled" away from metal layer 152. In particular, using rolling bead mechanism 120, a bonding photopolymer and a support layer (e.g., a primed polyester sheet) are added to protective layer 154 and cured. The photopolymer, support layer, and protective layer 154 are removed from stamper assembly 110. The metal layer 152 remains coupled to the first generation stamper 110 information layer 112. Peeling away of the protective layer 154 from metal layer 152 does not damage information or data tracks encoded within metal layer 152 and information layer 112. Preparation is now complete for electroforming a second generation stamper from the first generation stamper 110.

Figure 9:
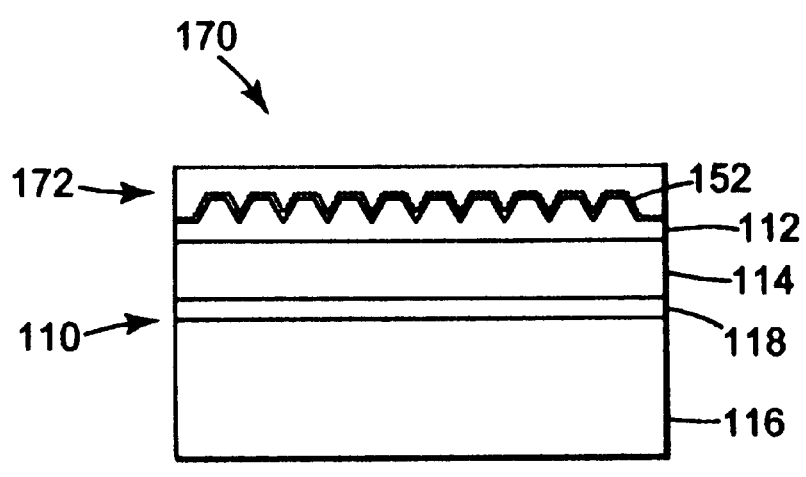
FIG. 9 is a diagram illustrating making a second generation stamper from a first generation stamper using a process in accordance with the present invention.

In FIG. 9, a stamper assembly 170 is shown illustrating a second generation stamper 172 formed from first generation stamper 110. During the electroforming process, a portion of first stamper 110 is transferred to second stamper 172. In particular, the portion of the first generation stamper 110, which defines the information layer including the data tracks encoded therein, is transferred to and becomes part of the second generation stamper 172. After undergoing an electroplating process, wherein structural layer 174 is plated over the first generation stamper 110 metal layer 152, metal layer 152 becomes part of second generation stamper 172.

Figure 10:
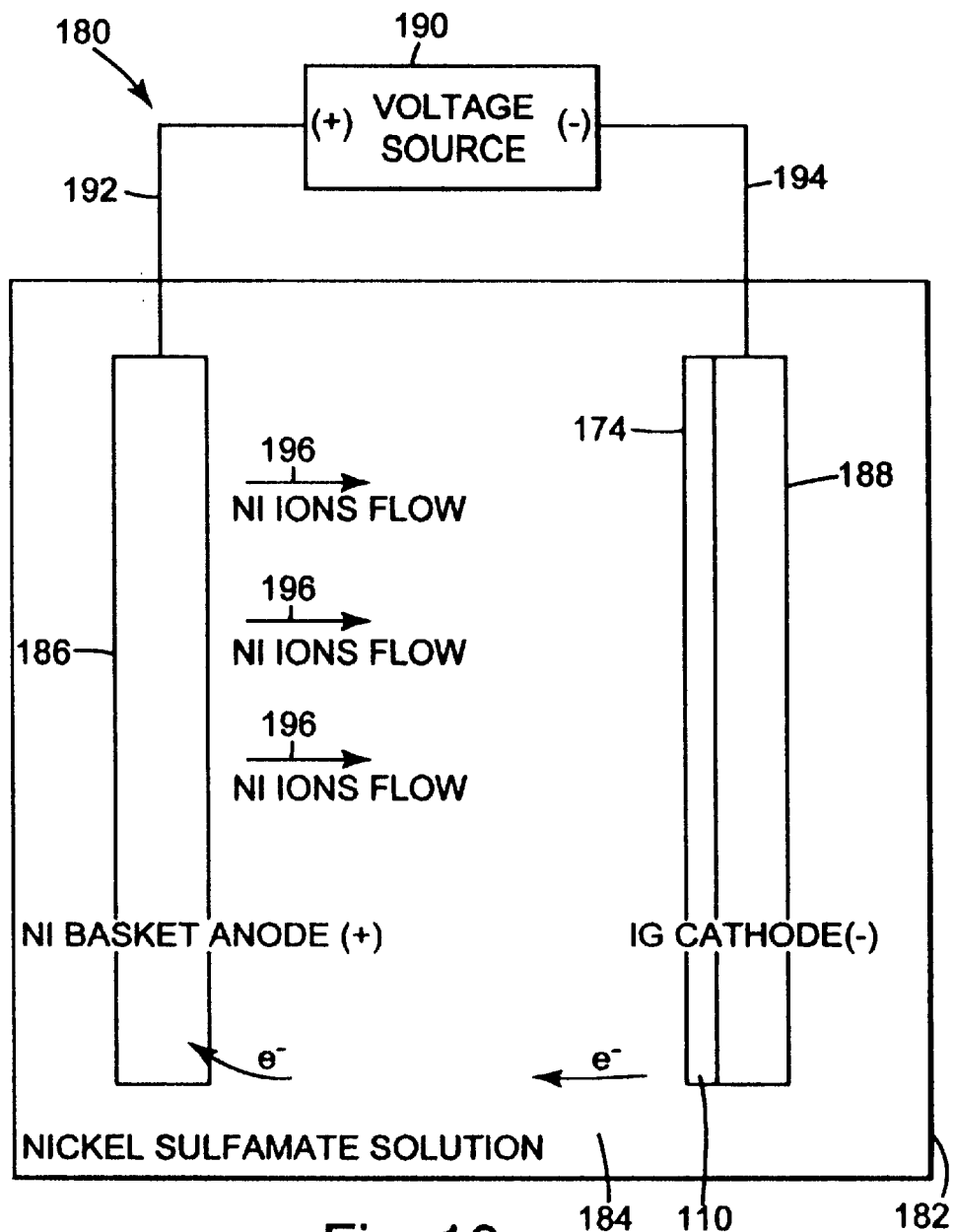
FIG. 10 is a diagram illustrating one exemplary embodiment of an electroplating process for use in a process for making a stamper in accordance with the present invention.

In FIG. 10, an electroforming process illustrating the manufacture of a second generation stamper 172 from a first generation stamper 110 is illustrated. In one exemplary embodiment shown, the electroforming process employed is an electroplating (galvanic) process. Electroforming process 180 includes an electroforming chamber 182, electroforming process solution 184, anode 186, cathode 188, and voltage source 190. Voltage source 190 has a positive terminal which is electrically coupled to anode 186, indicated at 192. Voltage source 190 has a negative terminal which is electrically coupled to cathode 188, indicated at 194. First generation stamper assembly 110 is mechanically coupled to cathode 188, and as such, becomes part of cathode 188 during the electroforming process 180. Cathode 188 and anode 186 are placed within electroforming chamber 182, and specifically, within the electroforming process solution 184.

In one preferred embodiment, anode 186 is a nickel anode, cathode 188 is made of copper, and electroforming process solution 184 is a nickel sulfamate solution. A plurality of anodes 186, in the form of nickel anode baskets, are placed within the nickel sulfamate electroforming solution 184 (only one shown). In operation, cathode 188 is rotated during the electroforming process 180. Voltage source 190 is activated. Upon activation of voltage source 190, nickel ions, indicated at 196, flow from nickel anodes 186 to cathode 188. Since everything on cathode 188 is masked with plastic, except for the face of the first generation stamper 110 (i.e., metal layer 152), a nickel structural layer 174 is uniformly plated onto first generation stamper 110. The electroforming process is started with a slow current, and nickel is uniformly built up to a desired thickness on the metal layer 152 (e.g., a thickness of 300 microns). When the plating process is complete, the exposed surface of the plated nickel structural layer 174 is polished. During the electroforming process, the metal layer 152 becomes part of the structural layer 174 to form second generation stamper 172.

Figure 11:
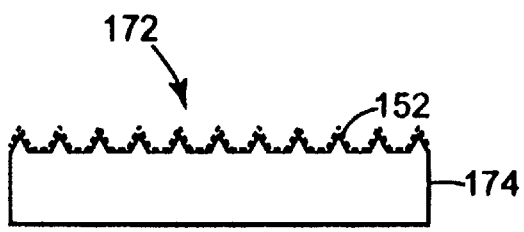
FIG. 11 is a diagram illustrating one exemplary embodiment of a second generation stamper made from a process for making a stamper in accordance with the present invention.

In FIG. 11, a partial cross-sectional view illustrating one exemplary embodiment of second generation stamper 172 is shown. Referring also to FIG. 9, second generation stamper 172, which includes structural layer 174 and metal layer 152, has been separated from first generation stamper 110. As the second generation stamper 172 is peeled away from the first generation stamper 110, metal layer 152 releases from information layer 112, while retaining the data structure of the data tracks encoded therein. The second generation stamper 172 may now be cleaned and punched. The above process cycle is not destructive to the first generation stamper 110. As such, the above process cycle may be repeated (i.e., a metal layer may be sputtered onto information layer 112 and plated in an electroforming process) to make multiple second generation stampers from a single first generation stamper.

Figure 12:
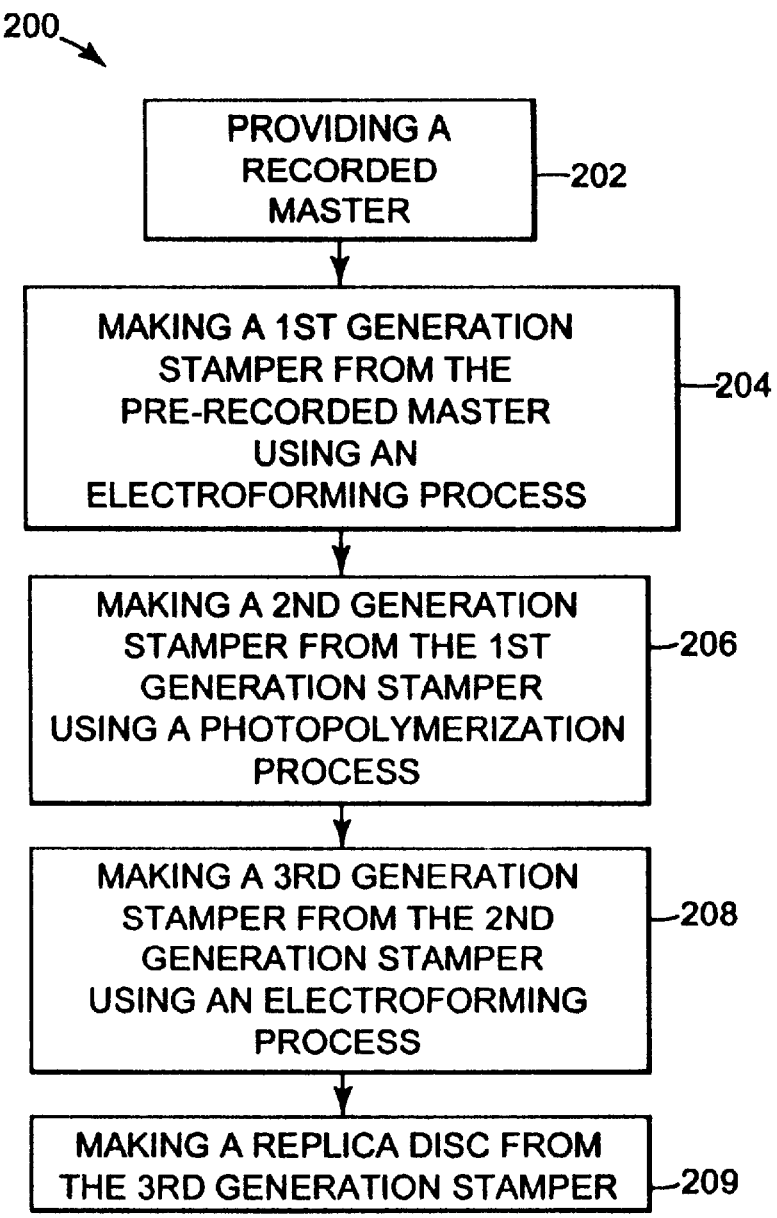
FIG. 12 is a block diagram illustrating another exemplary embodiment of a process for making a stamper in accordance with the present invention.

In FIG. 12, a block diagram illustrating another exemplary embodiment of a process for making multiple stampers from one master in accordance with the present invention 200 is shown. In the exemplary embodiment shown, the process for making a stamper 200 provides for making a third generation stamper for use in a process for molding optical data storage disk substrates. The process 200 uses steps similar to the process 30 previously described herein. The process 200 begins with a recorded master disk, indicated at 202. A first generation stamper is made from the recorded master disk 202 using an electroforming process, indicated at 204. A second generation stamper is made from the first generation stamper using a photopolymerization process, indicated at 206. A third generation stamper is made from the second generation stamper using an electroforming process, indicated at 208. A replica disk is made from the third generation stamper, indicated at 209.

The recorded master 202 includes an information layer having data which is encoded thereon/therein (i.e., in the form of grooves, pits, or lands) using laser writing (i.e., recording) techniques. The first generation stamper is made from the recorded master using an electroforming process which may be destructive to the recorded master 202. The second generation stamper is made from the first generation stamper using a photopolymerization process which can be similar to the photopolymerization process as previously described herein, and which is nondestructive to the first generation stamper. As such, multiple second generation stampers may be formed using a single first generation stamper. Further, a third generation stamper is made from the second generation stamper using an electroforming process. A portion of the second generation stamper, which defines the information layer, is transferred to and becomes part of the third generation stamper. Further, the electroforming process is not destructive to the second generation stamper. As such, multiple third generation stampers can be made from a single second generation stamper using similar electroforming processes.

Figure 13:
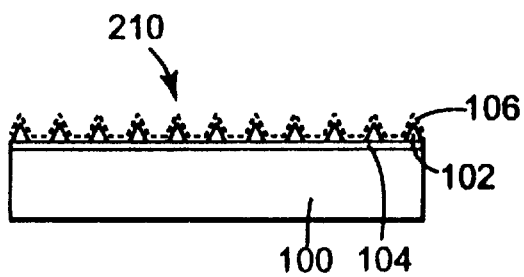
FIG. 13 is a diagram illustrating one exemplary embodiment of a recorded master for use in a process for making a stamper in accordance with the present invention.

In FIG. 13, one exemplary embodiment of a recorded master disk for use with a process for making a stamper 200 in accordance with the present invention is generally shown at 210. Recorded master disk 210 can be similar to the recorded master disk 90 previously described herein, and similarly includes support substrate 100, information layer 102, bonding layer 104, and reflective layer 106. In one preferred embodiment shown, reflective layer 106 is made of sputtered nickel having a thickness of approximately 30 nanometers. Support substrate 100 is made of glass and is approximately 5 mm thick. The glass substrate is polished smooth on one side with optical polish. The glass substrate is then washed in a clean room to remove contaminants. A very thin bonding layer 104 (approximately 10 nanometers) of primer is spin coated onto the glass support substrate 100.

Information layer 102 is formed by spin coating a layer of photoresist onto the bonding layer 104. The thickness of the information layer 102 (typically 50–200 nanometers) varies as desired according to the spin speed and the photoresist solution. Since spin coating is a solvent based process, the solvent can be driven out of the master 210 using a pre-bake process as previously indicated herein. The master 210 is then placed on a laser beam recorder (i.e., laser beam exposure table), wherein the laser beam is turned on and the master is spun at a desired speed to expose the information layer 102 (i.e., the photoresist) to the laser onbeam for the formation of grooves. On and off cycling (e.g., shuttering) of the laser beam is representative of the data to be encoded within the data tracks of information layer 102.

Recorded master disk 210 undergoes a development process. In one preferred embodiment, sodium hydroxide and water are dispersed across the master disk 210 as it rotates. As the master disk 210 is spinning, the photoresist is etched away by the solution in the areas where the photoresist was exposed to the laser beam. The desired recorded data pattern (i.e., in the form of grooves, pits and lands) is now encoded on the recorded master disk 210.

In one exemplary embodiment, for an air incident disk substrate, it is desirable to vary the intensity of the laser beam for a sufficient exposure time, such that a master groove or pit is defined by the photoresist being etched away down to the bonding or adhesive layer 104, resulting in high definition grooves and pits.

Master disk 210 is coded with reflective layer 106. In one preferred embodiment, the information layer 102 of master disk 210 is coated with a relatively thin layer (e.g., 30 nanometers of a metal, preferably nickel). As previously described herein, the reflective layer 106 serves at least two purposes. It provides a high quality reflecting surface for optical inspection of the disk quality and defects. Further, it acts as a preparation layer for the process of making a first generation stamper from the master disk 210.

Unlike the preparation of the optical disk master 90 for the second generation process previously described herein, preparation of the master for the third generation process 200 includes no UV light exposure or post baking of the photoresist information layer 102.

Figure 14:
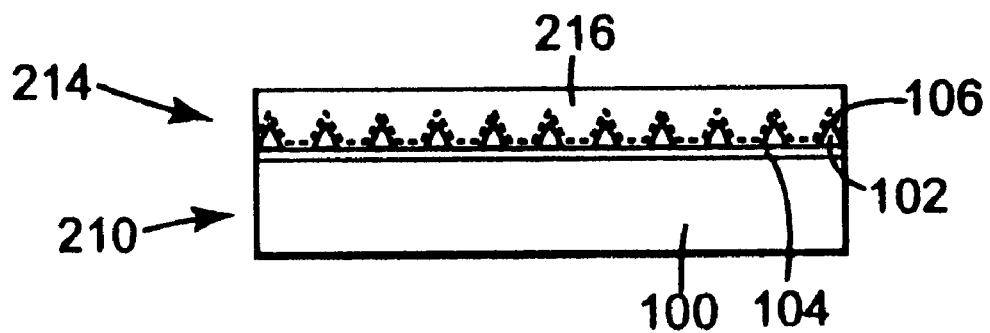
FIG. 14 is a diagram illustrating an exemplary embodiment of a step of making a first generation stamper from a recorded master using a process for making a stamper in accordance with the present invention.

In FIG. 14, making of a first generation stamper 214 from the master disk 210 using and electroforming process is illustrated. First generation stamper 214 is made from master disk 210 using an electroforming process which can be similar to the electroforming process previously described herein and illustrated in FIG. 10. In particular, a plated nickel support layer 216 is built up on reflective layer 106 to a desired uniform thickness. In one preferred embodiment, the nickel support layer 216 has a thickness of approximately 300 microns. During the electroforming process, the sputtered nickel reflective layer 106 becomes part of the plated nickel support layer 216. After the electroforming process is complete, the first generation stamper 214 is removed from (e.g., stripped off the master disk 210 and cleaned). The process of removing the first generation stamper 214 from the recorded master disk 210 is destructive to the master disk 210.

Figure 15:
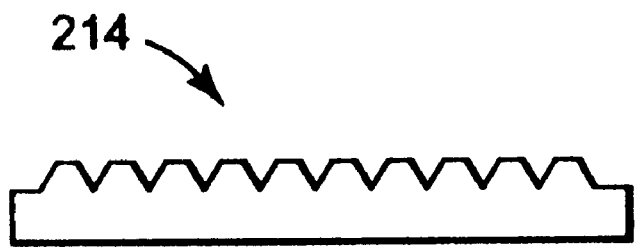
FIG. 15 is a diagram illustrating one exemplary embodiment of a first generation stamper formed in a process for making a stamper in accordance with the present invention.

Excess photoresist may be removed from the first generation stamper 214 through the application of a photoresist stripper chemical. No polishing of the back side of the first generation stamper 214 is necessary. A registration plate is attached to an edge of the first generation stamper 214. The registration plate registers the first generation stamper 214 such that its data tracks are concentric to a second generation glass substrate. The registration holes are mounted over two pegs of preventing sliding motion when the first generation stamper 214 is replicated onto the second generation glass substrate. This process can be repeated hundreds of times, creating many second generation stampers without deterioration in quality. In FIG. 15, completed first generation stamper 214 is illustrated. First generation stamper 214 has an information layer in the form of data tracks encoded therein which are the inverse of the data tracks encoded in master disk 210.

Figure 16:
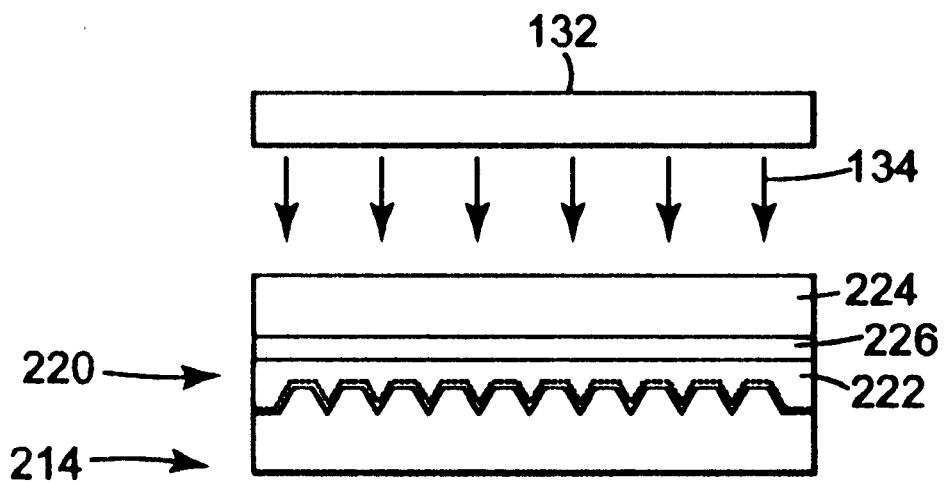
FIG. 16 is a diagram illustrating one exemplary embodiment of making a second generation stamper from a first generation stamper in a process for making a stamper in accordance with the present invention.

In FIG. 16, the process of making a second generation stamper 220 from the first generation stamper 214 is illustrated. In one preferred embodiment, the process used herein is a photopolymerization process which is similar to the photopolymerization process previously described herein. Second generation stamper 220 includes information layer 222 bonded to support substrate 224, which improves adhesion through the use of an adhesive primer 226. In particular, information layer 222 is made of photopolymer. Information layer 222 is positioned between support substrate 224 and first generation stamper 214 using a rolling bead replication process as previously described herein. Further, in one preferred embodiment the support substrate 224 is made of a transparent glass. Adhesive primer 226 is spin coated onto the glass support substrate 224 to aid in bonding of the information layer 222 to the support substrate 224. After completion of the rolling bead replication process, the photopolymer information layer 222 is cured using a UV light process as previously described herein. In particular, UV light source 132, UV light 134 passes through the glass support substrate 224, curing information layer 222 and bonding it to the support substrate 224.

Figure 17:
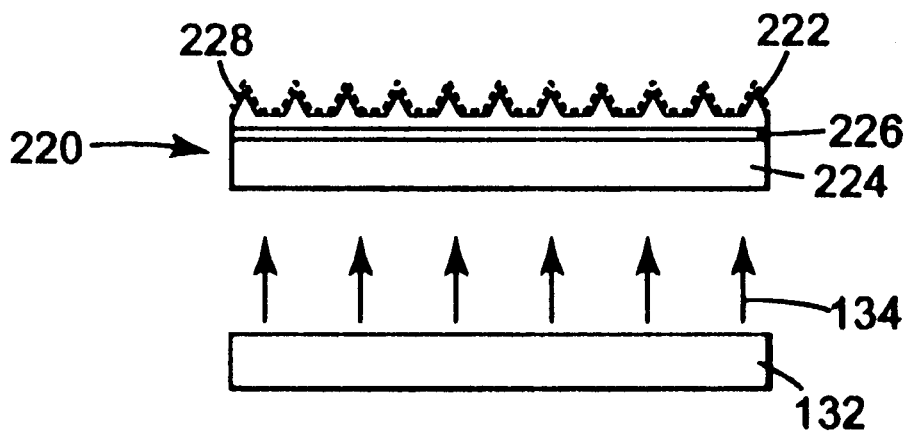
FIG. 17 is a diagram illustrating one exemplary embodiment of a step in preparing a second generation stamper for making a third generation stamper from the second generation stamper using a process for making a stamper in accordance with the present invention.
Figure 18:
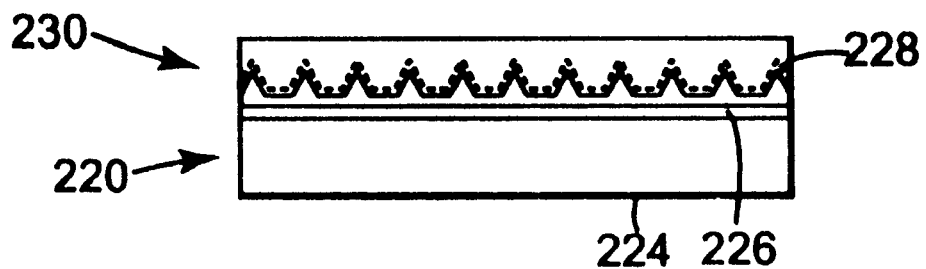
FIG. 18 is a diagram illustrating one exemplary embodiment of making a third generation stamper from a second generation stamper in a process for making a stamper in accordance with the present invention.

Referring to FIG. 17, after completion of the curing process, the first generation stamper 214 is removed (i.e., peeled away) from the second generation stamper 220. The second generation stamper 220 next goes through another UV exposure process, indicated by UV light source 132 and UV light 134, to cure any remaining uncured perimeter photopolymer in information layer 222. Metal layer 228 (or reflective layer) preferably nickel, is sputtered onto the surface of information layer 222. In one preferred embodiment, metal layer 228 is a nickel layer having a thickness of 30 nanometers. The preparation of second generation stamper 220 is now complete and ready for use in forming a third generation stamper 230 using an electroforming process. Using this process can be repeated hundreds of times creating many second generation stampers without deterioration quality.

A structural layer 232 is electroplated onto the second generation stamper 220 to form third generation stamper using the electroplating process previously described herein and shown in FIG. 10. In one preferred embodiment, structural layer 232 is plated nickel, built up to a desired thickness (e.g., approximately 300 microns). During the electroforming process, the nickel metal layer 228 becomes part of the structural layer 232. The back side of the third generation stamper 230 is polished while it is still bonded to the second generation stamper 220. After polishing, the third generation stamper 230 is removed (i.e., stripped oft) from the second generation stamper 220, cleaned and punched to match the desired mold die size. As the third generation stamper 230 is separated from the second generation stamper 220, metal layer 228 releases from information layer 222 and is transferred to the third generation stamper 230, maintaining the structural integrity of the data tracks encoded therein.

Figure 19:
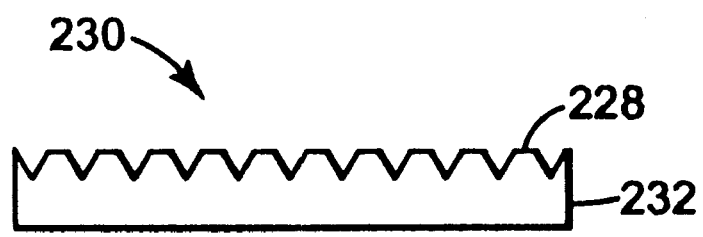
FIG. 19 is a diagram illustrating one exemplary embodiment of a third generation stamper made from a process for making a stamper in accordance with the present invention.

The above procedure of making a third generation stamper 230 from a second generation stamper 220 is non-destructive to the second generation stamper 220. As such, after re-metalization of the second generation stamper 220, the above process may be repeated for making multiple third generation stampers 230 from a single second generation stamper 220. In FIG. 19, a completed third generation stamper 230 is shown.

Suitable photopolymers for use in forming information layers, replication layers, or bonding layers discussed herein, include HDDA (4×6×) polyethylenically unsaturated monomer-hexanediol diacrylate; chemlink 102 (3×) monoethylenically unsaturated monomer-diethylene glycol monoethyl ether acrylate, elvacite 2043 (1×3×) organic polymer-polyethylmethacrylate, and irgacure 651 (0.1×0.2) latent radical initiator-2,2-dimethoxy-2-phenylacetophenone. Another suitable photopolymer includes HHA (hydantoin hexacryulate) 1×, HDDA (hexanediol diacrylate) 1×, and irgacure 651 (0.1×0.2) latent radical initiator-2,2-dimethyoxy-2-phenylacetophenone. Other suitable photopolymers may become apparent to those skilled in the art after reviewing this disclosure.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed is:

1. A method comprising:

providing a master disk, the master disk including a photoresist information layer;

making a first generation stamper from the master disk using a first photo polymerization process comprising depositing a first thin nickel layer onto the photoresist information layer, positioning a first photopolymer layer between the first thin nickel layer and a first support layer, curing the first photopolymer layer, and separating the first photopolymer layer from the first thin nickel layer forming a first photopolymer information layer, wherein separating the first photopolymer layer from the first thin nickel layer is non-destructive to the master disk, making a second generation stamper from the first generation stamper using a second photo polymerization process comprising depositing a second thin nickel layer onto the first photopolymer information layer, positioning a second photopolymer layer between the second thin nickel layer and a second support layer, curing the second photopolymer layer, and separating the second photopolymer layer from the second thin nickel layer forming a second photopolymer information layer, wherein separating the second photopolymer layer from the second thin nickel layer is non-destructive to the first generation stamper, and making a third generation stamper from the second generation stamper using a third process comprising coating the second photopolymer information layer with a first metal layer, coating the first metal layer with a second metal layer to form a stamper assembly, and separating the first and second metal layers from the stamper assembly to form the third generation stamper, wherein separating the first and second metal layers from the stamper assembly is nondestructive to the second generation stamper.

2. The method of claim 1, further comprising:

stamping a number of replica disks using the third generation stamper.

3. The method of claim 1, further comprising repeating the first photo polymerization process to make a number of first generation stampers.

4. The method of claim 1, further comprising repeating the second photo polymerization process to make a number of second generation stampers.

5. The method of claim 1, further comprising repeating the third process to make a number or third generation stampers.

6. The method of claim 1, wherein the metal layers include nickel.

7. The method of claim 1, wherein at least one of the support layers includes polymethylmethacrylate.

8. A method comprising:

providing a master disk, the master disk including a data encoded information layer;

making a first generation stamper from the master disk using a first electroplating process;

making a second generation stamper from the first generation stamper using a photo polymerization process including the steps of positioning a photopolymer layer between the first generation stamper and a support layer to form a photopolymer/support layer assembly, curing the photopolymer layer by passing light through the support layer, and separating the first generation stamper from the photopolymer/support layer assembly, wherein separating the first generation stamper from the photopolymer/support layer assembly is nondestructive to the first generation stamper; and making a third generation stamper from the second generation stamper using a second electroplating process comprising coating the photopolymer layer with a first metal layer, coating the first metal layer with a second metal layer to form a stamper assembly, and separating the first metal layer and the second metal layer from the photopolymer layer to form the third generation stamper, wherein separating the first metal layer and the second metal layer from the stamper assembly is nondestructive to the second generation stamper.

9. The method of claim 8, further comprising:

stamping a number of replica disks using the third generation stamper.

10. The method of claim 8, further comprising repeating the photo polymerization process to make a number of second generation stampers.

11. The method of claim 8, further comprising repeating the second electroplating process to make a number of third generation stampers.

12. The method of claim 8, wherein the metal layer includes nickel.

13. The method of claim 8, wherein the support layer includes polymethylmethacrylate.

14. The method of claim 8, further comprising:

stamping a number of replica disks using the first generation stamper.

15. The method of claim 8, further comprising stamping replica disks using the second generation stamper.

16. The method of claim 8, further comprising stamping replica disks using the third generation stamper.

17. The method of claim 8, wherein the thin nickel layer has a thickness of approximately 30 nanometers.

18. A method comprising:

providing a master disk, the master disk including a recorded information layer, and making a first generation stamper from the master disk without destroying the information layer on the master disk, wherein making the first generation stamper comprises depositing a thin nickel layer onto a photoresist information layer on the master, positioning a photopolymer layer between the thin nickel layer and a support layer, curing the photopolymer layer, and separating the photopolymer layer from the thin nickel layer to form a photopolymer information layer.

19. The method of claim 18, further comprising:

making a second generation stamper from the first generation stamper without destroying the first generation stamper.

20. The method of claim 19, further comprising:

making a third generation stamper from the second generation stamper without destroying the second generation stamper.

21. The method of claim 20, further comprising stamping replica disks using at least one of the stampers.

22. The method of claim 19, further comprising stamping replica disks using at least one of the stampers.

23. The method of claim 18, wherein the information layer is a photoresist information layer.

24. The method of claim 18, further comprising:

making another first generation stamper from the master disk.

25. The method of claim 18, wherein the thin nickel layer has a thickness of approximately 30 nanometers.

* * * * *